United States Patent [19]

Bielz et al.

[11] 4,372,939
[45] Feb. 8, 1983

[54] PROCESS OF PRODUCING CHLORINE DIOXIDE

[75] Inventors: Siegfried Bielz, Frankfurt am Main; Paul Janisch, Steinau; Karl Lohrberg, Heusenstamm, all of Fed. Rep. of Germany

[73] Assignee: Metallgesellschaft Aktiengesellschaft, Frankfurt am Main, Fed. Rep. of Germany

[21] Appl. No.: 272,856

[22] Filed: Jun. 12, 1981

Related U.S. Application Data

[63] Continuation of Ser. No. 142,909, Apr. 23, 1980, abandoned.

[30] Foreign Application Priority Data

Apr. 27, 1979 [DE] Fed. Rep. of Germany ....... 2917132

[51] Int. Cl.³ ............................................. C01B 11/02
[52] U.S. Cl. ..................................... 423/478; 413/487
[58] Field of Search ......................................... 423/478

[56] References Cited

U.S. PATENT DOCUMENTS

| | | | |
|---|---|---|---|
| 2,664,341 | 12/1953 | Kesting | 423/478 |
| 3,524,728 | 8/1970 | Westerlund | 423/478 |
| 3,607,027 | 9/1971 | Westerlund | 423/478 |
| 3,864,457 | 2/1975 | Hoekje | 423/478 |
| 4,176,168 | 11/1979 | Goto | 423/478 |

*Primary Examiner*—Brian E. Hearn
*Attorney, Agent, or Firm*—Sprung, Horn, Kramer & Woods

[57] ABSTRACT

In the continuous production of chlorine dioxide wherein an alkali metal chlorate solution is reacted with hydrochloric acid in a reactor through which an air stream is passed countercurrent to the alkali metal chlorate solution, and there discharged from the reactor chlorine dioxide and alkali metal chloride solution, the improvement which comprises including chlorine gas in the air stream, thereby permitting the overall efficiency of the process to be increased at a given content of chlorine dioxide in the gas discharged from the reactor.

13 Claims, 1 Drawing Figure

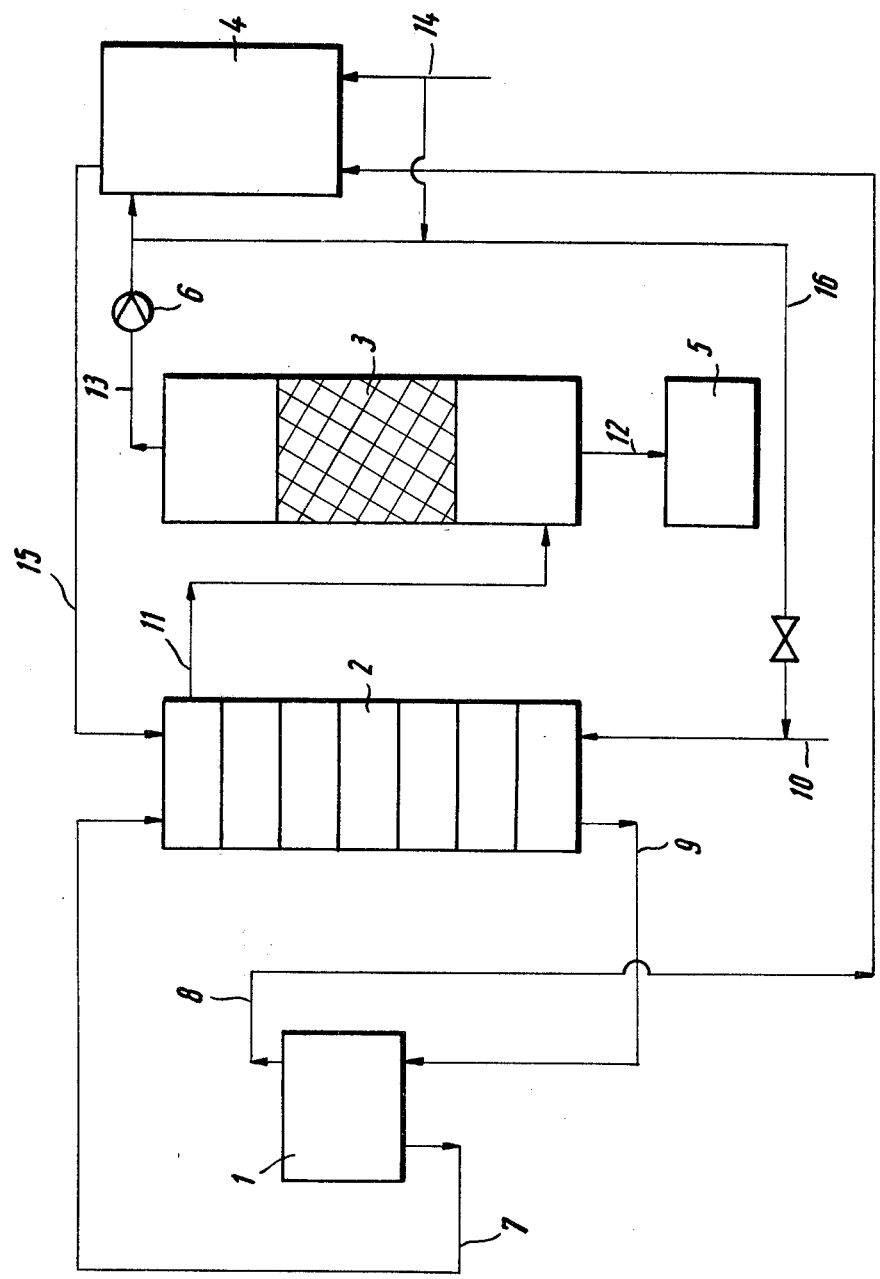

PROCESS OF PRODUCING CHLORINE DIOXIDE

This is a continuation of application Ser. No. 142,909, filed Apr. 23, 1980, abandoned.

This invention relates to a continuous process for producing chlorine dioxide.

Owing to its instability, chlorine dioxide cannot be produced in large quantity and stored until it is used but must be produced at the location where it is used and can be produced only at the rates which are immediately required and in exactly controlled concentrations. These requirements have previously involved considerable difficulties because the rates at which chlorine dioxide is immediately required usually vary within a considerable range, which is often wider than the range in which the preciously available chlorine dioxide generators are adjustable. For this reason it was necessary to maintain a relatively large number of chlorine dioxide generators and to initiate their operation from time to time. Another difficulty was involved in the requirement to maintain the chlorine dioxide in a harmless concentration throughout the generating system.

In the production of chlorine dioxide by the so-called "Munich process" it is known to produce a chlorate solution by an electrolysis of alkali metal chloride and to react said chlorate solution with hydrochloric acid to produce chlorine dioxide and chlorine, the spent chlorate solution being recycled. In the known process, the chlorine which becomes available as a by-product in the production of chlorine dioxide is burnt together with the hydrogen which becomes available in the chlorate-producing electrolysis. Hydrochloric acid is produced by said combustion. Air must be supplied to the chlorine dioxide reactor so that the concentration of the resulting chlorine dioxide in the gas is kept below 15% reliably to avoid an explosion which could otherwise be caused by a spontaneous decomposition of chlorine dioxide (German Patent Specification No. 831,542 and 924,689; "Ullmann", 3rd edition, 1954, volume 5, page 553).

The efficiency of the process depends on the following reactions:

$$2NaClO_3 + 4HCl \rightarrow 2ClO_2 + Cl_2 + 2NaCl + 2H_2O \quad (1)$$

$$NaClO_3 + 6HCl \rightarrow 3Cl_2 + NaCl + 3H_2O \quad (2)$$

Normally, the reaction expressed by equation (1) predominates. The reaction expressed by equation (2) increases as the chloride concentration increases. Reaction (2) is undesirable in principle because it does not produce chlorine dioxide but it cannot be entirely suppressed. The chlorine dioxide reactor would have an efficiency of 100% if there were no reaction according to equation (2). As this cannot be accomplished, the following relationships and balances of material are involved:

| Efficiency, % | 88 | 92 | 96 |
|---|---|---|---|
| Consumption of $NaClO_3$, metric tons per metric ton of $ClO_2$ | 1.8 | 1.72 | 1.64 |
| Consumption of HCl, metric tons per metric ton of $ClO_2$ | 1.52 | 1.36 | 1.22 |
| Production of $Cl_2$, metric tons per metric ton of $ClO_2$ | 0.96 | 0.80 | 0.66 |
| Production of $H_2$, metric tons per metric ton of $ClO_2$ | 0.102 | 0.097 | 0.093 |
| $H_2$ requirement, metric tons per metric ton of $ClO_2$ | 0.102 | 0.099 | 0.097 |

From the above values it is apparent that the efficiency of the production of chlorine dioxide by the known process cannot be increased above 88% because in that case the hydrogen would no longer be sufficient for the combustion of chlorine, which becomes available as a by-product, together with the oxygen of the air used as a carrier gas. On the other hand, such an increase in efficiency would be desirable.

Besides, hydrochloric acid at a stoichiometric ratio to the chlorine dioxide is required as a raw material in the known Munich process. If that hydrochloric acid is to be produced, e.g., by a combustion of evaporated chlorine with hydrogen, the rate at which hydrogen becomes available in the chlorate-producing electrolysis will by no means be sufficient.

Nitrogen or another inert gas cannot be used rather than air as a carrier gas because a minimum quantity of chlorine and oxygen is required for the combustion of hydrogen. These concentrations are, e.g., 15% chlorine plus 10% oxygen or, e.g., 32% chlorine. This constitutes another limitation of the known process.

It is an object of the invention to avoid the restrictions and disadvantages of the known process, to increase the efficiency and to improve the safety in operation.

This object is accomplished by the invention in a continuous process for producing chlorine dioxide in which alkali metal chlorate is reacted with hydrochloric acid in a reactor and an air stream is introduced countercurrent to the liquid stream.

In a process of this kind, the invention resides in that at least part of the air stream introduced into the reactor is replaced by a chlorine gas stream.

The rate at which chlorine gas is introduced is suitably controlled to correspond to the rate at which chlorine is discharged from the reactor in the form of chlorine dioxide.

Because, in accordance with the invention, at least part of the air stream is replaced by a chlorine gas stream, the rate at which oxygen is introduced in order to dilute the chlorine dioxide is decreased whereas the concentration of $ClO_2$ in the gas is not increased. The oxygen rate is kept so low that the chlorine which becomes available as a by-product in the production of chlorine dioxide as well as the additional chlorine required to meet the hydrogen chloride requirement of the reaction can be burnt with the hydrogen resulting from the chlorate-producing electrolysis. It is also desirable to decrease the oxygen rate to such an extent that there is a surplus of hydrogen for the combustion of chlorine.

The chlorine gas stream which is introduced into the reactor to replace at least part of the air stream is generally supplied from external source rather than from the process itself. For the purposes of the invention, the external source supplying the chlorine gas stream may consist, e.g., of an alkali metal chloride producing electrolytic cell, such as a membrane cell, or from a pressure-resisting vessel which contains liquefied chlorine gas. In another embodiment of the invention, the carrier gas may be scrubbed to remove the chlorine dioxide and the chlorine gas formed in the process as a by-product of the decomposition of chlorate may also be recycled into the reactor.

A minimum concentration of chlorine in the air stream supplied to the chlorine dioxide reactor is 18% by volume corresponding to 88% efficiency, whilst concentrations of 20, 23, 24 and 24.5% by vol. of chlorine correspond to 90, 92, 94 and 96% efficiency of the chlorine dioxide reactor.

The process according to the invention affords various advantages in the continuous production of chlorine dioxide by the decomposition of alkali metal chlorates with hydrochloric acid.

The chlorine dioxide content of the reactor gas can be kept as low as desired below 15%, far below the explosion limit.

The efficiency of the chlorine dioxide reactor is greatly increased so that the economy is much improved.

Air to be recycled is replaced by chlorine so that the combustion is much more reliable because the gas to be burnt contains 100% by volume of chlorine rather than the 21% by volume of oxygen contained in the air.

The combustion of chlorine and hydrogen to form hydochloric acid is effected with a surplus of hydrogen.

Because gas at a lower rate is required for the combustion, the hydrochloric acid-producing furnace and the hydochloric acid absorber may consist of smaller units.

The invention will be explained in more detail with reference to the accompanying drawing which is a flow sheet of the process.

In the drawing, alkali metal chlorate from a chlorate-producing electrolytic cell 1 is fed through duct 7 into a reactor 2, in which chlorate is decomposed to produce chlorine dioxide. An air stream is fed to the reactor 2 via duct 10. An aqueous solution of hydrogen chloride is withdrawn from the absorber of the combustion reactor 4 and supplied via conduit 15 to the reactor 2. The combustion reactor 4 is supplied with hydrogen via duct 8 and from a separate chlorine source with chlorine gas via duct 14. Sodium chloride solution is withdrawn from reactor 2 through line 9 to be employed in forming chlorate in cell 1. The mixed gases consisting of chlorine dioxide and carrier gas flow through a transfer duct 11 into an absorber 3, from which an aqueous solution of chlorine dioxide is withdrawn via conduit 12 and collected in tank 5. The remaining mixed gases from which the chlorine dioxide has been removed are supplied through duct 13 and blower 6 to the combustion reactor 4 or are recycled at least in part to the reactor 2 via duct 16, which may also be used to supply extraneous chlorine to the reactor.

The invention is further illustrated in the following example:

EXAMPLE 8 metric tons of chlorine dioxide and 20 metric tons of chlorine are required per day in a pulp plant for producing 500 metric tons of bleached pulp per day. The chlorine is supplied in liquid form. The chlorine dioxide-producing reactor is to be operated with an efficiency of 92%. 13.76 metric tons of alkali metal chlorate are required per day in that case. 0.776 metric ton of hydrogen becomes available per day as the alkali metal chlorate is produced. 10.88 metric tons of HCl are required per day to produce 8 metric tons of chlorine dioxide per day by the reaction of alkali metal chlorate.

0.792 metric ton of hydrogen per day would be required if the carrier gas contained 15% chlorine dioxide. 0.298 metric ton of hydrogen per day would be consumed to produce the above-mentioned 10.88 metric tons of HCl per day. In accordance therewith, 0.494 metric ton of hydrogen per day would be required to burn the oxygen in the diluting air but only 0.478 metric ton of $H_2$ per day is available from the chlorate-producing electrolysis. Without a desirable surplus of hydrogen in the production of hydrochloric acid, only 3.24% of the diluting air would have to be recycled to ensure a safe operation of the overall process.

It will be appreciated that the instant specification and examples are set forth by way of illustration and not limitation, and that various modifications and changes may be made without departing from the spirit and scope of the present invention.

What is claimed is:

1. In the continuous production of chlorine dioxide containing gases wherein an alkali metal chlorate solution is reacted with hydrochloric acid in a reactor through which an air stream is passed countercurrent to the alkali metal chlorate solution, the chlorine dioxide is removed from said gases and virtually chlorine dioxide free gases are at least partially burned in the presence of hydrogen to form HCl and there are discharged from the reactor chlorine dioxide and alkali metal chloride solution, the improvement which comprises adding chlorine gas to the air stream in an amount of at least 18 volume percent, said amount of chlorine also being at least equal to that in which chlorine is discharged from the reactor in the form of chlorine dioxide, thereby permitting the overall efficiency of the process to be increased at a given content of chlorine dioxide in the gas discharged from the reactor.

2. A process according to claim 1, wherein the chlorine introduced into the reactor is supplied from an external source.

3. A process according to claim 1, wherein the gas stream leaving the reactor is treated to remove chlorine dioxide from the residual gas containing chlorine, and the residual gas at least in part is recycled to the reactor as a source of chlorine to be supplied.

4. A process according to claim 1 wherein said hydrogen is produced in an electrolysis cell in which the alkali metal chloride is also produced, said hydrogen is reacted with chlorine in a combustion zone wherein the hydrogen is present in excess and the resultant product is fed to said reactor.

5. A process according to claim 4 wherein said hydrogen chloride which is fed to said reactor is in admixture with unreacted hydrogen.

6. A process according to claim 5 wherein at least a portion of the chlorine which reacts with hydrogen is supplied from an external source.

7. A process according to claim 5 wherein at least a portion of the chlorine which reacts with said hydrogen is chlorine formed by reaction of said alkali metal chlorate solution with said hydrochloric acid.

8. A process according to claim 1 wherein said hydrochloric acid is formed by reacting chlorine from a separate source and chlorine formed by reaction of said alkali metal chloride with said hydrochloric acid with hydrogen in the presence of excess hydrogen.

9. A process according to claim 1 wherein the chlorine content in the air stream is at least 20% by volume.

10. A process according to claim 1, wherein the chlorine content in the air stream is at least 23% by volume.

11. A process according to claim 1, wherein the chlorine content in the air stream is at least 24% by volume.

12. A process according to claim 1 wherein said hydrogen chloride is in the form of an aqueous solution.

13. A process according to claim 12 wherein said air stream containing said chlorine is passed in countercurrent to said aqueous hydrogen chloride solution.

* * * * *